United States Patent [19]

Gulistan

[11] Patent Number: 5,146,668
[45] Date of Patent: Sep. 15, 1992

[54] METHOD FOR MANUFACTURING PART FOR FLOATING NUT ASSEMBLY

[76] Inventor: Bulent Gulistan, 20568 Pinnacle Way, Malibu, Calif. 90265

[21] Appl. No.: 717,327

[22] Filed: Jun. 18, 1991

[51] Int. Cl.5 .......................... B23P 17/00; B21J 5/12; F16B 37/04
[52] U.S. Cl. ........................................ 29/525; 72/356; 72/338; 470/26; 470/89; 411/108; 411/103
[58] Field of Search .............. 72/333, 334, 356, 355.6, 72/355.4, 355.2, 338; 10/76 R, 76 T, 78, 82, 83, 86 F, 86 R; 411/103, 105, 108, 172, 111; 470/26, 89; 29/428, 525

[56] References Cited

U.S. PATENT DOCUMENTS

| | | | |
|---|---|---|---|
| 2,216,201 | 10/1940 | Keller | 72/356 |
| 2,253,765 | 8/1941 | Cox | 10/78 |
| 2,294,458 | 9/1942 | Hungerford | 10/76 R |
| 2,586,336 | 2/1952 | Huck | 72/355.4 |
| 3,247,698 | 4/1966 | Baldwin | 72/334 |
| 3,655,349 | 4/1972 | Shah | 72/42 |
| 3,695,324 | 10/1972 | Gulistan | 411/111 |
| 4,193,435 | 3/1980 | Charles | 411/103 |
| 4,557,650 | 12/1985 | Molina | 411/108 |
| 4,732,518 | 3/1988 | Toosky | 411/108 |

OTHER PUBLICATIONS

Schey, J. A., *Metal Deformation Processes, Friction And Lubrication*, Marcel Dekker Inc., New York, 1970, pp. 677, 680.

*Primary Examiner*—Daniel C. Crane
*Attorney, Agent, or Firm*—Poms, Smith, Lande & Rose

[57] ABSTRACT

An attaching sleeve for a floating nut assembly is formed from rod or wire stock by successive cold heading or cold forming operations. The steps involve cutting off a longitudinal segment from the stock, forming a flange on the front end of the segment, forming a centrally disposed opening through the segment, and forming longitudinally extending ridges projecting outwardly around the periphery of the segment. The attaching sleeves made by the method of the present invention have accurately positioned ridges or knurls which will consistently mate with a similarly configured opening in panels to which the floating nut assembly is to be secured.

4 Claims, 2 Drawing Sheets

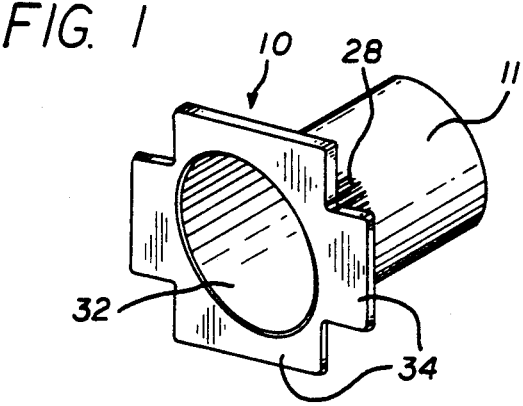
FIG. 1
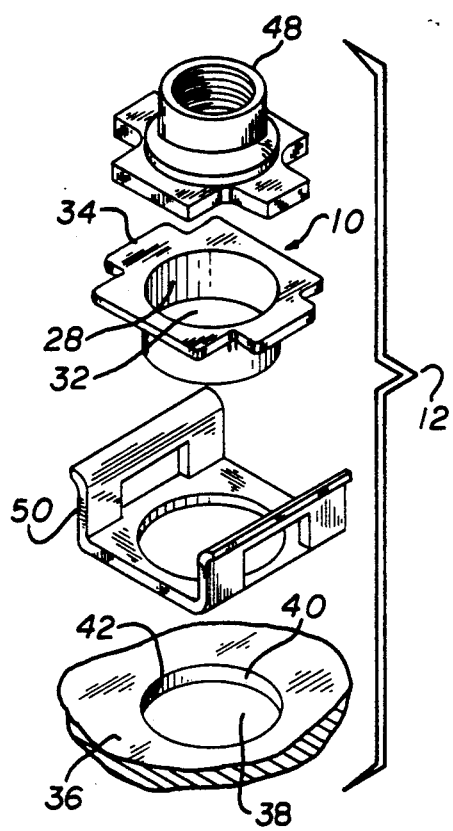
FIG. 2
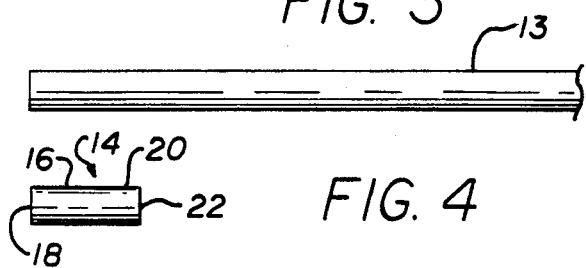
FIG. 3
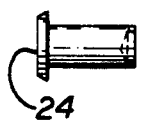
FIG. 4
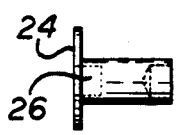
FIG. 5
FIG. 6
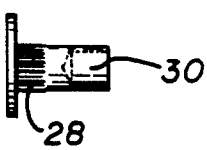
FIG. 7
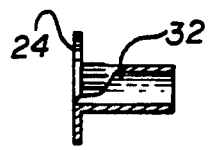
FIG. 8
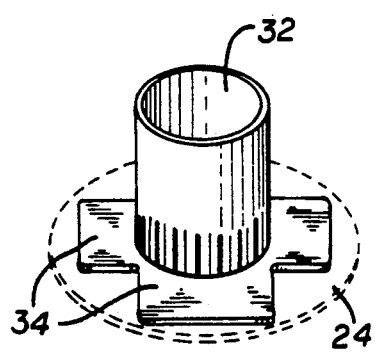
FIG. 9

METHOD FOR MANUFACTURING PART FOR FLOATING NUT ASSEMBLY

BACKGROUND OF THE INVENTION

1. Field of the Invention

This invention relates to a method for manufacturing an attaching sleeve for a floating nut assembly. Further provided are the attaching sleeves formed by the method of the present invention.

2. Description of Related Art

Nut plates have been used extensively on panels and other parts for holding a nut to a panel so that the nut is always available with limited floating movement of the nut being permitted so that it can be more easily engaged by a bolt. Such a fastening device includes a receptacle which is provided by a flat plate from which portions are bent to engage and retain flanges projecting from the nut. This holds the nut to the receptacle while allowing movement of the nut.

Nut plates typically were installed on a panel or other workpiece by drilling accurately spaced openings for rivets through the panel. Several of these openings were used to secure the receptacle to the panel with the rivets. This is a time-consuming and relatively expensive operation.

Efforts have been made to provide a floating nut plate which avoided the use of the rivets for attachment to the panel. This was done by providing a knurled sleeve to fit in the opening in the panel. The knurled sleeve would become embedded in the panel and resist rotation. Tubular portions were provided on such sleeves having straight knurls on the periphery of the tube to dig into the wall of the opening in the panel. This operated to prevent rotation of the nut plate. However, this design had the disadvantage that the knurl didn't fit the wall of the opening tightly enough. It didn't embed itself securely in the wall of the opening, gripping with low torque resistance. When a bolt was subsequently engaged by the nut plate, the entire nut plate turned with the bolt, which prevented the bolt from being threaded into the nut, and sometimes the bolt fell out of the nut.

U.S. Pat. No. 3,695,324 is included in such floating nut assemblies, which provides a lightweight floating nut arrangement having a sleeve member with a tubular section that extends through a hole in the panel. Attachment of the assembly to the workpiece was accomplished by extending a tubular section through the single opening in the workpiece. A straight knurl was provided on the tubular portion and became embedded in the periphery of the opening in the panel which thereby prevented rotation of the assembly.

One disadvantage of that design, as well as previous designs, results from the method for manufacturing the attaching sleeve. Those methods produce sleeves with knurls that do not securely embed in the wall of the opening of the workpiece. This is due to an imprecise and inaccurate method for forming knurls on the tubular section. Knurls or ridges are typically formed by a rolling knurl tool rolled around the tubular sleeve, forming a plurality of knurls or ridges. The placement of these ridges, however, is difficult to precisely control. As a result, difficulties are encountered in placing the knurls or ridges on the tubular sections precisely in line with recesses formed in the wall of the opening of the workpiece or panel, particularly when the panel or workpiece is formed of very hard material where such mating recesses in the panel are employed. As a result, slippage may occur between the tubular section and the workpiece when a bolt is subsequently engaged by the nut assembly.

One obvious disadvantage of these nut assemblies is that they may lead to inefficiencies in bolt installation caused by nut slippage, or loosening of the entire assembly prior to bolt installation. It would be desirable to have a floating nut assembly in which this slippage between the nut assembly and the wall of the opening of the workpiece was eliminated by a method of manufacture which accurately and precisely places ridges or ribs on the tubular section that securely fit into and mate with recesses placed on the wall of the opening of the workpiece.

A further disadvantage encountered in the manufacture of prior floating nut assemblies, and in particular with attaching sleeves involved in floating nut assemblies, is the large number of steps required to manufacture these pieces. They are manufactured as piece work, requiring drilling, stamping, knurling, and other machining steps. These multiple manufacturing steps are expensive. Furthermore, the resulting parts are not identical. Large variations from piece to piece are seen in the critically fitting areas of the piece, such as the knurls or ridges. In addition, the drilling and other steps result in much unnecessary scrap metal.

It would be desirable to provide a method of manufacture which reduces the number of steps in forming such attaching sleeves. It would be further desirable for such a method to provide accurate, precise, and consistent placement of ridges or knurls. Further desired would be a manufacturing method which produces attaching sleeves which consistently fit the workpiece opening snugly with sufficient torque resistance to make bolt installation efficient in workpieces requiring floating nut assemblies. Also desirable would be a manufacturing method which operated automatically with rate of production much higher than piece-work manufacture.

SUMMARY OF THE INVENTION

In accordance with the present invention, a method is provided for forming an attaching sleeve for a floating nut assembly which overcomes the above-mentioned difficulties and provides the advantages of high-speed, cost-efficient, precision manufacture of attaching sleeves, which tightly fit previously formed holes in a work piece or panel. The steps of the method of the present invention are substantially achieved by cold heading operations.

The method involves the discovery that cold heading forging operations, typically used in manufacturing solidcored bolts and screws, could be used in manufacturing hollow-bodied parts by means of appropriate dies and mating dies.

The method of the invention involves cutting off a longitudinal segment from an input bar or wire. This segment has a first portion located toward a front end of the segment, and a second portion located toward a rear end of the segment. On the front end of the longitudinal segment, a cold heading operation forms a first flange. A second successive cold heading operation may complete the formation of the first flange, and may form a first centrally disposed hole in the front end of the segment. The hole extends rearward from the flange toward the second portion of the segment. By a further cold heading operation, the method of the invention forms longitudinally extending ridges or knurls projecting outwardly around the periphery of the first portion of the longitudinal segment. The ridges are adjacent the first flange. A second centrally disposed hole is achieved in the course of the cold heading operations. This second hole is formed in the rear end of the longitudinal segment. The second hole extends forward from the rear end toward the first portion. Following a final cold heading type operation, the second hole is extended to communicate with the first hole to form a substantially uniform diameter opening through the longitudinal segment. The invention further provides a step for trimming the generally circular flange to form outwardly extending tabs.

As an additional feature of the invention, the rear end of the attaching sleeve is relatively malleable so that the rear end can be bent outwardly to form a rear flange used in holding the attaching sleeve to a workpiece.

The ridges provided by the cold heading operation of the present invention are located inwardly from the rear end of the segment. The ridges are straight knurls.

The attaching sleeve formed by the method of the present invention includes a hollow cylindrical body portion, a plurality of tabs extending outwardly from one end of the cylindrical body, and longitudinally extending ridges or knurls disposed around the body portion. The knurls are located adjacent the tabs.

The invention further provides the attaching sleeves produced by the method of the present invention. The attaching sleeves accomplish attachment of the floating nut assembly to a workpiece by extending the cylindrical body through a single opening in the workpiece. The straight ridges or knurls provided by the method of the invention on the periphery of the cylindrical body become embedded in the periphery of the opening of the workpiece or panel, which thereby prevents rotation of the assembly. As noted above, for panels formed of hard materials, the holes in the panels may be provided with an accurately formed set of grooves or recesses which mate precisely with the accurately formed ridges on the attaching sleeve.

Other objects, features and advantages of the invention will become apparent from a consideration of the following detailed description and from the accompanying drawings.

BRIEF DESCRIPTION OF THE DRAWINGS

FIG. 1 is an isometric view of an attaching sleeve formed in accordance with the method of the present invention;

FIG. 2 is an exploded view of a fastener nut assembly including the attaching sleeve of FIG. 1;

FIG. 3 is a side view of input rod or wire stock from which the attaching sleeve is formed;

FIG. 4 is a side view of a longitudinal segment cut or sheared off from the wire stock shown in FIG. 3 and to be formed into the attaching sleeve in FIGS. 5-9;

FIG. 5 and FIG. 6 are successive sides views of the part of FIG. 4 following cold heading operations by which a first flange is formed at the front end and a first centrally disposed hole is formed;

FIG. 7 shows the longitudinal segment of FIG. 6 following additional cold forming steps in which longitudinal ridges or knurls are formed adjacent the flange and a second centrally disposed hole is initiated in the rear end of the segment;

FIG. 8 is a partial cross-sectional view showing the final configuration of the attaching sleeve as it is ejected from the cold heading machine;

FIG. 9 is an isometric view of the attaching sleeve following the trimming step;

DETAILED DESCRIPTION OF THE PREFERRED EMBODIMENT

Figure 10:
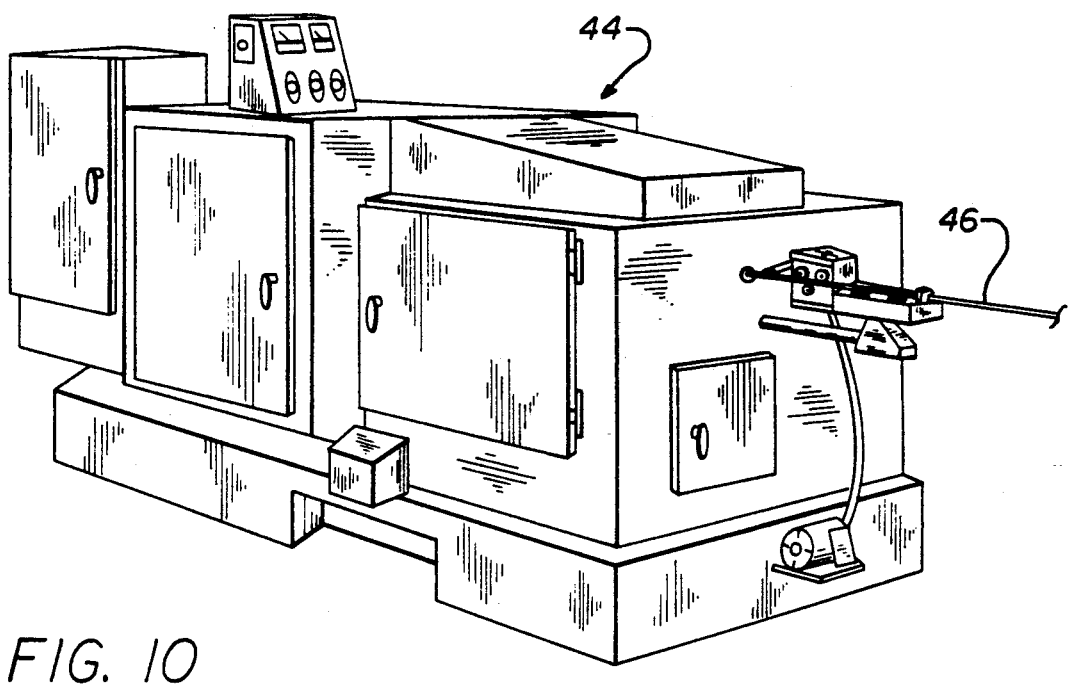
FIG. 10 is a side view of a multiple position cold heading machine in which the steps of FIGS. 4-8 are performed.

Referring more particularly to the drawings, FIG. 1 shows the attaching sleeve 10 for a floating nut assembly 12. The attaching sleeve 10 has a hollow cylindrical body portion 11, a plurality of tabs 34 extending outwardly from one end of the cylindrical body 11, and longitudinally extending ridges 28 or knurls disposed around the cylindrical body portion 11. The knurls 28 are adjacent the tabs 34.

FIG. 2 is an exploded perspective view of a floating nut assembly 12 and includes the attaching sleeve 10 formed by the method of the present invention. The floating nut assembly 12, as illustrated in FIG. 2, consists of three parts that include a nut 48, a basket 50 and an attaching sleeve 10. The basket 50 holds the nut 48, allowing limited floating movement while preventing substantial rotation of the nut 48. The attaching sleeve 10 secures the basket 50 to the workpiece 36.

The method of the present invention for forming an attaching sleeve for a floating nut assembly is substantially achieved by cold heading operations in a cold heading machine 44. FIG. 10 shows the step of the method of the present invention in which an input bar or wire or rod stock (13) or other precursor material is inputted into the cold heading machine 44. Wire stock 13 typically used in the method of the present invention is may be a soft steel with a very thin coating of copper to facilitate forming operations. An exemplary cold heading machine 44 for use in the method of the present invention is that made by a Japanese company named Nakashimada, a known supplier of cold forming machines.

Within the cold heading machine, the first step is to shear or cut off a longitudinal segment 14 from an input bar or wire stock 13. This longitudinal segment 14 has a first portion 16 located toward a front end 18 of the longitudinal segment 14. The front end 18 of the longitudinal segment 14 enters the cold heading machine ahead of a second portion 20 of the longitudinal segment 14. The second portion 20 of the longitudinal segment 14 is located toward the rear end 22 of the segment 14.

As shown in FIG. 5, a cold heading operation forms a first flange 24 on the front end 18 of the longitudinal segment 14. This first flange 24 is formed by striking the front end of the longitudinal segment with a recessed forming die. Typically, formation of the first flange is completed in a successive cold heading operation, which involves striking the front end 18 of the longitudinal segment 14 with a recessed die having a somewhat shallower recess of greater diameter than that involved in the first cold heading operation.

A centrally disposed hole 26 is formed in the second cold heading operation concurrently with the expansion of the flange in the front end 18 of the longitudinal segment 14, and this first hole 26 extends rearward from the first flange 24 toward the second portion 20 of the segment 14.

A further cold heading operation forms longitudinally extending ridges or knurls 28 which project outwardly around the periphery of the first portion 16 of the longitudinal segment 14. These longitudinal ridges 28 are located adjacent the flange 24. A second hole 30 is formed in the rear end 22 of the longitudinal segment 14 in the course of the cold heading operations which form the ridges in a successive step indicated in FIG. 7. This second hole 30 is centrally disposed in the rear end 22 of the longitudinal segment 14. The second hole 30 extends forward from the rear end 22 toward the first portion 16 following the final cold trimming operation indicated by FIG. 8. The second hole 30 communicates with the first hole 26 to form a substantially uniform diameter opening 32 extending all the way through the longitudinal segment 14 from the front end 18 to the rear end 22. All of the above operations are achieved by cold forming operations within the cold heading machine 44.

The attaching sleeve 10, as shown in FIG. 8, is ejected from the cold heading machine 44. The method of the invention provides a further step for subsequently trimming the first flange 24 formed in the cold heading operation in the cold heading machine. This trimming step forms the first flange into a plurality of outwardly extending tabs. This trimming step is typically accomplished using a stamping machine.

As a feature of the invention, the rear end 22 of the attaching sleeve 10 is relatively malleable. This is advantageous because it permits the outward deformation of the rear end to provide a flange for use in holding the attaching sleeve 10 to a workpiece or panel 36.

It should also be noted that the longitudinal ridges 28 formed by the cold heading operation of the present invention are located inwardly of the rear end 22. A preferred form of the ridges produced by the method of the present invention is straight knurls.

Certain advantages are provided by the method of the present invention for manufacturing the attaching sleeve. These advantages include faster manufacture of the attaching sleeves in automated cold heading operations relative to manufacture by piece work. A further advantage of the method is cost-efficiency, that is, the cost of making an attaching sleeve by the method of the present invention is much less than that for an attaching sleeve produce by piece work, which includes the successive steps of machining, boring, knurling, and other manufacturing steps as mentioned above The method of the invention also provides the advantage of forming attaching sleeves with precision-placed longitudinal ridges or knurls. This results in better-fitting attaching sleeves, less slippage in the workpiece when a bolt is installed, and more efficient manufacturing techniques.

In accordance with the present invention, an attaching sleeve 10 for a floating nut assembly 12 is provided, which is produced by the method of the present invention. The attaching sleeve 10 includes a hollow, cylindrical body portion 11, a plurality of tabs 34 extending outwardly from the front end 18 of the cylindrical body 11, and longitudinally extending ridges or knurls 28 accurately and precisely disposed around said body portion adjacent said tabs 34.

For attaching a floating nut assembly to a workpiece, as illustrated in FIG. 2, the cylindrical body portion 11 of the attaching sleeve 10 is extended through the opening 38 of the workpiece 36. The straight knurl 28 provided on the cylindrical body 11 embeds in the recesses 42 of the wall of the opening 38 of the workpiece 36. Rotation of the floating nut assembly 12 in the workpiece when a bolt is installed is prevented by the straight knurls 28 gripping the recesses 42 in the wall 40 with sufficient torque resistance.

Figure 11:
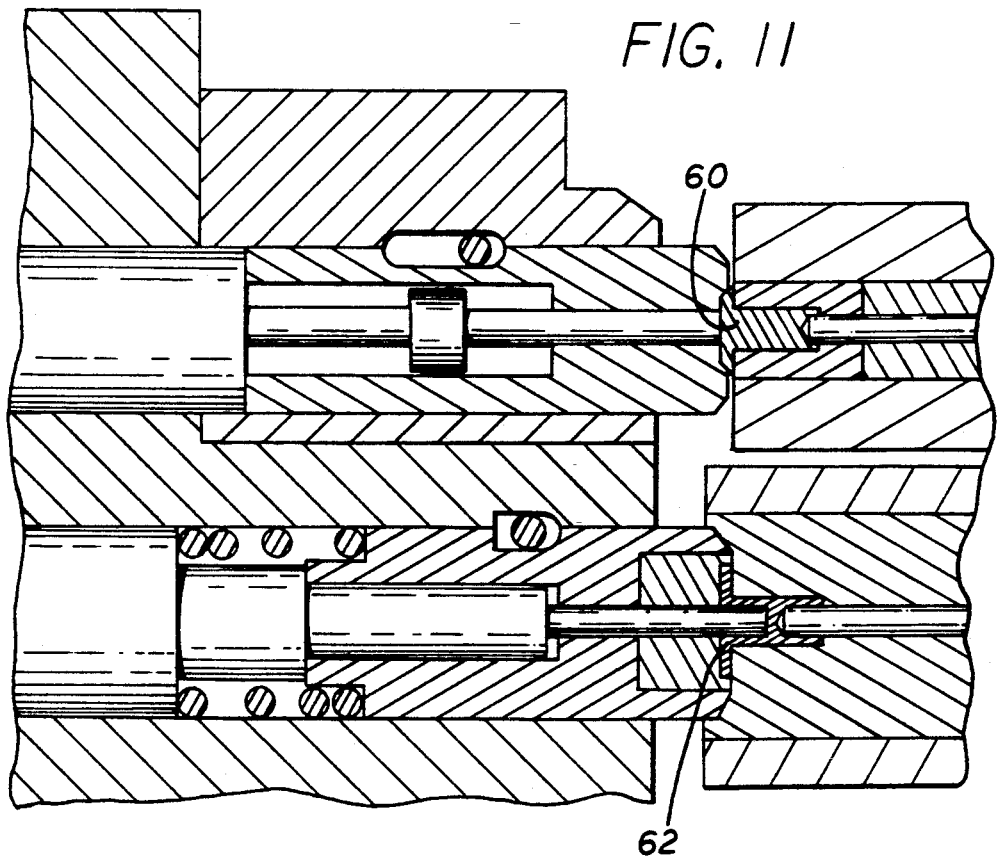
FIG. 11 is a schematic cross-sectional view of a portion of the die mechanism of the cold heading machine shown in FIG. 10.

As indicated schematically in FIG. 11, the method of the invention forms the attaching sleeve 10 by cold heading operations that include striking the longitudinal segment 14 with dies 60, 62. FIG. 11 shows the formation of the flange 24 of FIG. 5 and FIG. 6 and the formation of the first hole 26 in the front 18 of the longitudinal segment 14 by successive cold forming operations. The top portion of FIG. 11 corresponds to the cold forming operation that achieves formation of the flange 24 by an initial striking of the front end 18 of the longitudinal segment 14 with a recessed forming dye 60. The bottom portion of FIG. 11 corresponds to the cold forming operation that completes the formation of the flange 24 by the successive striking of the flange 24 formed in the initial striking. The successive striking typically completes formation of the flange by striking with a recessed die having a somewhat shallower recess of greater diameter than that involved in the initial striking. The successive striking also involves the initial formation of the first hole 26 in the front end 18. In a similar manner as well known in the art, successive cold forming operations achieve the method of the invention, completing the formation of the attaching sleeve.

It is to be understood that the dimensions of the attaching sleeve may vary in accordance with the application. However, in one illustrative example of a part formed in accordance with the invention, the sleeve was about ⅜ inch long, the wall thickness was about 0.020 inch, and the diameter of the sleeve was about ¼ inch. The overall extent of the flanges or tabs was slightly less than ½ inch, and the ridges extended from the flange a distance of about 3/32 inch. There were approximately 20 ridges or knurls around the periphery of the sleeve and they extended outwardly from the sleeve by about the thickness of the sleeve wall, or about 0.020 inch. Also, the wire or rod input stock was formed of a relatively soft steel, plated with a very thin plating of copper to facilitate the forming operations.

The present invention is not limited precisely to the embodiments shown in the drawing and as described in detail herein above. Thus, by way of example and not by limitation, the length and diameter of the sleeve may vary and it may be formed by different materials. Further, the outwardly extending flanges or tabs may be dimensioned to fit the complete assembly.

What is claimed is:

1. A method for forming and securing an attaching sleeve for a floating nut assembly comprising the steps of:

cutting off a longitudinal segment from an input bar or wire stock made of steel, said longitudinal segment having a first portion located toward a front end of said segment, and a second portion located toward a rear end of said segment;

forming a first flange on said front end of said longitudinal segment;

forming a first centrally disposed hole in said front end of said longitudinal segment, said hole extending rearward from said flange toward the second portion of said segment;

forming a predetermined number of longitudinally extending knurls projecting outwardly around the periphery of said first portion adjacent said flange;

forming a second centrally disposed hole in said rear end of said longitudinal segment, said second hole extending forward from said rear end toward the first portion, said hole communicating with said first hole to form a substantially uniform diameter opening through said segment;

all of said forming steps being achieved by cold heading or cold deforming operations;

trimming said flange to form outwardly extending tabs;

preparing a hole for receiving said sleeve having recesses around the inner wall of said hole, the number of said recesses being equal to said predetermined number of cold headed or deformed knurls; and subsequent to preparing said hole, securing said cold headed or deformed sleeve into said hole by embedding or pressing said sleeve into said hole with each knurl fitting into a corresponding recess in the wall of said hole.

2. The method of claim 1 wherein said flange is formed in a plurality of successive cold heading operations.

3. The method of claim 1 in which said ridges are formed as straight knurls.

4. A method as defined in claim 1 wherein said input steel bar or wire stock is provided with a thin coating of a malleable metal.

* * * * *